(12) United States Patent
de Mersseman et al.

(10) Patent No.: US 11,194,022 B2
(45) Date of Patent: Dec. 7, 2021

(54) DETECTION SYSTEM WITH REFLECTION MEMBER AND OFFSET DETECTION ARRAY

(71) Applicant: Veoneer US, Inc., Southfield, MI (US)

(72) Inventors: Bernard de Mersseman, Andover, MA (US); Peter Hansson, Stockholm (SE); Emil Hällstig, Stockholm (SE)

(73) Assignee: Veoneer US, Inc., Southfield, MI (US)

( * ) Notice: Subject to any disclaimer, the term of this patent is extended or adjusted under 35 U.S.C. 154(b) by 767 days.

(21) Appl. No.: 15/995,980

(22) Filed: Jun. 1, 2018

(65) Prior Publication Data

US 2019/0101645 A1     Apr. 4, 2019

Related U.S. Application Data

(60) Provisional application No. 62/594,284, filed on Dec. 4, 2017, provisional application No. 62/565,373, filed on Sep. 29, 2017.

(51) Int. Cl.
  *G01S 7/481*   (2006.01)
  *G01S 17/87*   (2020.01)
  (Continued)

(52) U.S. Cl.
  CPC .............. *G01S 7/4817* (2013.01); *B60Q 1/52* (2013.01); *G01S 7/4811* (2013.01);
  (Continued)

(58) Field of Classification Search
  None
  See application file for complete search history.

(56) References Cited

U.S. PATENT DOCUMENTS

| 3,712,985 A | 1/1973 | Swarner et al. |
| 3,898,656 A | 8/1975 | Jensen |

(Continued)

FOREIGN PATENT DOCUMENTS

| AT | 509180 B1 | 1/2016 |
| DE | 19757840 C1 | 9/1999 |

(Continued)

OTHER PUBLICATIONS

Invitation to Pay Additional Fees dated Mar. 8, 2019 in PCT/US2018/052849.

(Continued)

*Primary Examiner* — Hovhannes Baghdasaryan
*Assistant Examiner* — Amir J Askarian
(74) *Attorney, Agent, or Firm* — Burns & Levinson LLP; Steven M. Mills

(57) ABSTRACT

A detection system for a vehicle in an environment has a reflective member positioned along an x-y plane for rotation around a rotational axis orthogonal to the x-y plane. The reflective member has a plurality of reflective sides, each of the reflective sides sloping towards the rotational axis at a slope angle different than the slope angle of at least one of the others of the reflective sides. At least one detector is positioned offset from the rotational axis and the x-y plane, an active side of the plurality of reflective sides positioned to provide a field of view between the detector and the environment. An actuator is configured to rotate the reflective member around the rotational axis to change the active reflective side to a different one of the plurality of reflective sides.

17 Claims, 13 Drawing Sheets

(51) Int. Cl.

| | | |
|---|---|---|
| *G02B 5/09* | (2006.01) | |
| *G02B 26/12* | (2006.01) | |
| *G01S 17/42* | (2006.01) | |
| *G01S 17/04* | (2020.01) | |
| *G01S 17/931* | (2020.01) | |
| *G01S 17/06* | (2006.01) | |
| *B60Q 1/52* | (2006.01) | |
| *G01S 13/931* | (2020.01) | |

(52) U.S. Cl.
CPC .......... *G01S 7/4812* (2013.01); *G01S 7/4813* (2013.01); *G01S 7/4815* (2013.01); *G01S 17/04* (2020.01); *G01S 17/06* (2013.01); *G01S 17/42* (2013.01); *G01S 17/87* (2013.01); *G01S 17/931* (2020.01); *G02B 5/09* (2013.01); *G02B 26/12* (2013.01); *G01S 2013/93271* (2020.01); *G01S 2013/93276* (2020.01)

(56) References Cited

U.S. PATENT DOCUMENTS

| | | |
|---|---|---|
| 4,125,864 A | 11/1978 | Aughton |
| 4,184,154 A | 1/1980 | Albanese et al. |
| 4,362,361 A | 12/1982 | Campbell et al. |
| 4,439,766 A | 3/1984 | Kobayashi et al. |
| 4,765,715 A | 8/1988 | Matsudaira et al. |
| 4,957,362 A | 9/1990 | Peterson |
| 5,200,606 A | 4/1993 | Krasutsky et al. |
| 5,210,586 A | 5/1993 | Grage et al. |
| 5,274,379 A | 12/1993 | Carbonneau |
| 5,428,215 A | 6/1995 | Dubois et al. |
| 5,604,695 A | 2/1997 | Cantin et al. |
| 5,793,491 A | 8/1998 | Wangler et al. |
| 5,889,490 A | 3/1999 | Wachter et al. |
| 5,966,226 A | 10/1999 | Gerber |
| 6,078,395 A | 6/2000 | Jourdain et al. |
| 6,122,222 A | 9/2000 | Hossack |
| 6,292,285 B1 | 9/2001 | Wang et al. |
| 6,384,770 B1 | 5/2002 | De Gouy |
| 6,437,854 B2 | 8/2002 | Hahlweg |
| 6,556,282 B2 | 4/2003 | Jamieson et al. |
| 6,559,932 B1 | 5/2003 | Halmos |
| 7,202,941 B2 | 4/2007 | Munro |
| 7,227,116 B2 | 6/2007 | Gleckler |
| 7,272,271 B2 | 9/2007 | Kaplan et al. |
| 7,440,084 B2 | 10/2008 | Kane |
| 7,483,600 B2 | 1/2009 | Achiam et al. |
| 7,489,865 B2 | 2/2009 | Varshneya et al. |
| 7,544,945 B2 | 6/2009 | Tan et al. |
| 7,570,347 B2 | 8/2009 | Ruff et al. |
| 7,675,610 B2 | 3/2010 | Redman et al. |
| 7,832,762 B2 | 11/2010 | Breed |
| 8,044,999 B2 | 10/2011 | Mullen et al. |
| 8,050,863 B2 | 11/2011 | Trepagnier et al. |
| 8,134,637 B2 | 3/2012 | Rossbach et al. |
| 8,223,215 B2 | 7/2012 | Oggier et al. |
| 8,363,511 B2 | 1/2013 | Frank et al. |
| 8,508,723 B2 | 8/2013 | Chang et al. |
| 8,629,975 B1 | 1/2014 | Dierking et al. |
| 8,742,325 B1 | 6/2014 | Droz et al. |
| 8,836,761 B2 | 9/2014 | Wang et al. |
| 8,836,922 B1 | 9/2014 | Pennecot |
| 8,879,050 B2 | 11/2014 | Ko |
| 9,007,569 B2 | 4/2015 | Amzajerdian et al. |
| 9,063,549 B1 | 6/2015 | Pennecot et al. |
| 9,086,273 B1 * | 7/2015 | Gruver .................. G01S 17/42 |
| 9,090,213 B2 | 7/2015 | Lawlor et al. |
| 9,097,646 B1 | 8/2015 | Campbell et al. |
| 9,140,792 B2 | 9/2015 | Zeng |
| 9,157,790 B2 | 10/2015 | Shpunt et al. |
| 9,267,787 B2 | 2/2016 | Shpunt et al. |
| 9,285,477 B1 | 3/2016 | Smith et al. |
| 9,575,162 B2 | 2/2017 | Owechko |
| 9,618,742 B1 | 4/2017 | Droz et al. |
| 9,651,417 B2 | 5/2017 | Shpunt et al. |
| 9,658,322 B2 | 5/2017 | Lewis |
| 9,696,427 B2 | 7/2017 | Wilson et al. |
| 9,711,493 B2 | 7/2017 | Lin |
| 9,753,351 B2 | 9/2017 | Eldada |
| 9,823,351 B2 | 11/2017 | Haslim et al. |
| 9,857,472 B2 | 1/2018 | Mheen et al. |
| 9,869,754 B1 * | 1/2018 | Campbell ............. G01S 7/4817 |
| 10,018,725 B2 | 7/2018 | Liu |
| 10,018,726 B2 | 7/2018 | Hall et al. |
| 10,024,655 B2 | 7/2018 | Raguin et al. |
| 10,078,133 B2 | 9/2018 | Dussan |
| 10,088,557 B2 | 10/2018 | Yeun |
| 10,148,060 B2 | 12/2018 | Hong et al. |
| 10,175,360 B2 | 1/2019 | Zweigle et al. |
| 10,183,541 B2 | 1/2019 | Van Den Bossche et al. |
| 10,411,524 B2 | 9/2019 | Widmer et al. |
| 10,416,292 B2 | 9/2019 | de Mersseman et al. |
| 10,473,767 B2 | 11/2019 | Xiang et al. |
| 10,473,784 B2 | 11/2019 | Puglia |
| 10,473,943 B1 | 11/2019 | Hughes |
| 10,557,923 B2 | 2/2020 | Watnik et al. |
| 10,558,044 B2 | 2/2020 | Pan |
| 10,564,268 B2 | 2/2020 | Turbide et al. |
| 10,578,724 B2 | 3/2020 | Droz et al. |
| 10,678,117 B2 | 6/2020 | Shin et al. |
| 10,775,508 B1 * | 9/2020 | Rezk .................... G01S 7/4816 |
| 2001/0052872 A1 | 12/2001 | Hahlweg |
| 2003/0043363 A1 | 3/2003 | Jamieson |
| 2004/0028418 A1 | 2/2004 | Kaplan et al. |
| 2004/0031906 A1 | 2/2004 | Glecker |
| 2004/0135992 A1 | 7/2004 | Munro |
| 2004/0155249 A1 | 8/2004 | Narui et al. |
| 2005/0219506 A1 * | 10/2005 | Okuda .................. G01S 7/4972 |
| | | 356/28 |
| 2006/0221250 A1 | 10/2006 | Rossbach et al. |
| 2006/0232052 A1 | 10/2006 | Breed |
| 2006/0239312 A1 | 10/2006 | Kewitsch et al. |
| 2007/0140613 A1 | 6/2007 | Achiam et al. |
| 2007/0181810 A1 * | 8/2007 | Tan ...................... G01S 7/4811 |
| | | 250/341.1 |
| 2007/0211786 A1 | 9/2007 | Shatill |
| 2007/0219720 A1 | 9/2007 | Trepagnier et al. |
| 2008/0088499 A1 | 4/2008 | Bonthron et al. |
| 2008/0095121 A1 | 4/2008 | Shatill |
| 2008/0100510 A1 | 5/2008 | Bonthron |
| 2008/0219584 A1 | 9/2008 | Mullen et al. |
| 2008/0246944 A1 | 10/2008 | Redman et al. |
| 2009/0002680 A1 | 1/2009 | Ruff et al. |
| 2009/0010644 A1 | 1/2009 | Varshneya |
| 2009/0190007 A1 | 7/2009 | Oggier |
| 2009/0251361 A1 | 10/2009 | Bensley |
| 2010/0027602 A1 | 2/2010 | Abshire et al. |
| 2010/0128109 A1 | 5/2010 | Banks |
| 2010/0157280 A1 | 6/2010 | Kusevic et al. |
| 2010/0182874 A1 | 7/2010 | Frank et al. |
| 2012/0075422 A1 | 3/2012 | Wang et al. |
| 2012/0182540 A1 | 7/2012 | Suzuki |
| 2012/0206712 A1 | 8/2012 | Chang et al. |
| 2012/0236379 A1 | 9/2012 | da Silva et al. |
| 2012/0310516 A1 | 12/2012 | Zeng |
| 2012/0310519 A1 | 12/2012 | Lawlor et al. |
| 2013/0088726 A1 | 4/2013 | Goyal et al. |
| 2013/0093584 A1 | 4/2013 | Schumacher |
| 2013/0120760 A1 | 5/2013 | Raguin et al. |
| 2013/0166113 A1 | 6/2013 | Dakin et al. |
| 2013/0206967 A1 | 8/2013 | Shpunt et al. |
| 2013/0207970 A1 | 8/2013 | Shpunt et al. |
| 2013/0222786 A1 | 8/2013 | Hanson et al. |
| 2013/0250276 A1 | 9/2013 | Chang et al. |
| 2014/0036252 A1 | 2/2014 | Amzajerdian et al. |
| 2014/0049609 A1 | 2/2014 | Wilson |
| 2014/0152975 A1 | 6/2014 | Ko |
| 2014/0168631 A1 | 6/2014 | Haslim |
| 2014/0233942 A1 | 8/2014 | Kanter |
| 2014/0313519 A1 | 10/2014 | Shpunt et al. |
| 2015/0009485 A1 | 1/2015 | Mheen |
| 2015/0055117 A1 | 2/2015 | Pennecot et al. |
| 2015/0234308 A1 | 8/2015 | Lim et al. |

(56) References Cited

U.S. PATENT DOCUMENTS

| | | |
|---|---|---|
| 2015/0260843 A1 | 9/2015 | Lewis |
| 2015/0301162 A1 | 10/2015 | Kim |
| 2015/0371074 A1 | 12/2015 | Lin |
| 2015/0378011 A1 | 12/2015 | Owechko |
| 2016/0047895 A1 | 2/2016 | Dussan |
| 2016/0047896 A1 | 2/2016 | Dussan |
| 2016/0047903 A1 | 2/2016 | Dussan |
| 2016/0138944 A1 | 5/2016 | Lee et al. |
| 2016/0178749 A1 | 6/2016 | Lin et al. |
| 2016/0200161 A1 | 7/2016 | Van Den Bossche et al. |
| 2016/0245902 A1 | 8/2016 | Watnik et al. |
| 2016/0280229 A1 | 9/2016 | Kasahara |
| 2016/0291160 A1 | 10/2016 | Zweigle et al. |
| 2016/0357187 A1 | 12/2016 | Ansari |
| 2016/0363669 A1 | 12/2016 | Liu |
| 2016/0380488 A1 | 12/2016 | Widmer |
| 2017/0023678 A1 | 1/2017 | Pink et al. |
| 2017/0090013 A1 | 3/2017 | Paradie et al. |
| 2017/0102457 A1 | 4/2017 | Li |
| 2017/0199273 A1 | 7/2017 | Morikawa et al. |
| 2017/0219696 A1 | 8/2017 | Hayakawa et al. |
| 2017/0269215 A1 | 9/2017 | Hall et al. |
| 2017/0270381 A1 | 9/2017 | Itoh et al. |
| 2017/0285346 A1 | 10/2017 | Pan |
| 2017/0307736 A1 | 10/2017 | Donovan |
| 2017/0307737 A1 | 10/2017 | Ishikawa et al. |
| 2017/0329010 A1 | 11/2017 | Warke et al. |
| 2017/0329011 A1 | 11/2017 | Warke et al. |
| 2018/0052378 A1 | 2/2018 | Shin et al. |
| 2018/0113193 A1 | 4/2018 | Huemer |
| 2018/0128903 A1 | 5/2018 | Chang |
| 2018/0143309 A1* | 5/2018 | Pennecot ............... G01S 17/06 |
| 2018/0180718 A1 | 6/2018 | Lin |
| 2018/0224529 A1* | 8/2018 | Wolf ..................... G01S 17/08 |
| 2018/0241477 A1 | 8/2018 | Turbide et al. |
| 2018/0306913 A1 | 10/2018 | Bartels |
| 2018/0341009 A1 | 11/2018 | Niclass et al. |
| 2018/0364334 A1 | 12/2018 | Xiang et al. |
| 2018/0372870 A1 | 12/2018 | Puglia |
| 2019/0101644 A1 | 4/2019 | DeMersseman et al. |
| 2019/0129009 A1 | 5/2019 | Eichenholz et al. |
| 2019/0139951 A1 | 5/2019 | T'Ng et al. |
| 2019/0146060 A1 | 5/2019 | Qiu et al. |
| 2019/0195990 A1 | 6/2019 | Shand |
| 2019/0235064 A1 | 8/2019 | Droz et al. |
| 2020/0081129 A1 | 3/2020 | de Mersseman et al. |
| 2020/0088847 A1 | 3/2020 | DeMersseman et al. |

FOREIGN PATENT DOCUMENTS

| | | |
|---|---|---|
| DE | 102004033944 A1 | 2/2006 |
| DE | 102006031114 A1 | 1/2008 |
| DE | 102008045387 A1 | 3/2010 |
| DE | 102015217908 A1 | 3/2017 |
| EP | 0112188 A2 | 6/1984 |
| EP | 0578129 A2 | 1/1994 |
| EP | 2696166 A2 | 2/2014 |
| EP | 2824418 A1 | 1/2015 |
| EP | 3147685 A1 | 3/2017 |
| EP | 3203259 A1 | 8/2017 |
| EP | 3457080 A1 | 3/2019 |
| WO | 1994019705 A1 | 9/1994 |
| WO | 2008/008970 A2 | 1/2008 |
| WO | 2015/014556 A2 | 2/2015 |
| WO | 2016/097409 A2 | 6/2016 |
| WO | 2019050643 A1 | 3/2019 |
| WO | 2019099166 A1 | 5/2019 |

OTHER PUBLICATIONS

International Search Report and Written Opinion in corresponding International Application No. PCT/US2018/048869, dated Nov. 8, 2018; 14 pages.

International Search Report and Written Opinion in corresponding International Application No. PCT/US2018/051281, dated Nov. 22, 2018; 14 pages.

International Search Report and Written Opinion in corresponding International Application No. PCT/US2018/057727, dated Jan. 28, 2019; 12 pages.

International Search Report and Written Opinion in corresponding International Application No. PCT/US2018/052837, dated Jan. 24, 2019; 13 pages.

Skolnik, M.I., Introduction to Radar Systems, 3rd Edition, pp. 45-48, McGraw-Hill, New York, NY 2001; 6 pages.

Range-Doppler image processing in linear FMCW Radar and FPGA Based Real-Time Implementation, Journal of Communication and Computer, vol. 6, No. 4, Apr. 2009.

Church et al., "Evaluation of a steerable 3D laser scanner using a double Risley prism pair," SPIE Paper.

Luhmann, "A historical review on panorama photogrammetry," http://www.researchgate.net/publication/228766550.

International Search Report and Written Opinion for International Application No. PCT/US2020/039760, dated Sep. 18, 2020.

Kasturi et al., UAV-Borne LiDAR with MEMS Mirror Based Scanning Capability; SPIE Defense and Commercial Sensing Conference 2016; Apr. 20, 2016; Baltimore, MD; 10 pages.

Internet URL: https://www.continental-automotive.com/en-gl/Passenger-Cars/Chassis-Safety/Advanced-Driver-Assistance-Systems/Cameras [retrieved on Dec. 20, 2018].

Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].

Roncat, Andreas, The Geometry of Airborne Laser Scanning in a Kinematical Framework, Oct. 19, 2016 [retrieved on Dec. 19, 2018] Retrieved from the Internet URL: https://www.researchgate.net/profile/Andreas_Roncat/publication/310843362_The_Geometry_of_Airborne_Laser_Scanning_in_a_Kinematical_Framework/links/5839add708ae3a74b49ea03b/The-Geometry-of-Airborne-Laser-Scanning-in-a-Kinematical-Framework.pdf.

Internet URL: http://www.advancedscientificconcepts.com/products/overview.html [retrieved on Dec. 20, 2018].

Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.

A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_laser_sensors_in_self-driving_cars.jsp.

Hewlett-Packard Application Note 77-4, Swept-Frequency Group Delay Measurements, Hewlett-Packard Co., Sep. 1968, 7 pages.

Kravitz et al., High-Resolution Low-Sidelobe Laser Ranging Based on Incoherent Pulse Compression, IEEE Photonics Technology Letters, vol. 24, No. 23, Dec. 1, 2012, pp. 2119-2121.

Journet et al., A Low-Cost Laser Range Finder Based on an FMCW-like Method, IEEE Transactions on Instrumentation and Measurement, Aug. 2000, vol. 49, No. 4, pp. 840-843.

Campbell et al., Advanced Sine Wave Modulation of Continuous Wave Laser System for Atmospheric CO2 Differential Absorption Measurements; NASA Langley Research Center; 32 pages [retrieved on Dec. 20, 2018].

Levanon et al., Non-coherent Pulse Compression—Aperiodic and Periodic Waveforms; The Institution of Engineering and Technology, 2015; 9 pages.

Peer et al., Compression Waveforms for Non-Coherent Radar, Tel Aviv University; 6 pages [retrieved on Dec. 20, 2018].

Li, Larry, Time-of-Flight Camera—An Introduction, Technical White Paper, SLOA190B, Texas Instruments; Jan. 2014; 10 pages.

Pierrottet et al., Linear FMCW Laser Radar for Precision Range and Vector Velocity Measurements, Coherent Applications, Inc.; NASA Langley Research Center; 9 pages [retrieved on Dec. 20, 2018].

(56) References Cited

OTHER PUBLICATIONS

Kahn, Joseph M., Modulation and Detection Techniques for Optical Communication Systems, Stanford University, Department of Electrical Engineering, 2006; 3 pages.

Niclass et al., Development of Automotive LIDAR, Electronics and Communications in Japan, vol. 98, No. 5, 2015; 6 pages.

International Search Report and Written Opinion in corresponding PCT Application No. PCT/US2017/033271, International Filing Date May 18, 2017; dated Sep. 1, 2017.

Su et al., 2-D FFT and Time-Frequency Analysis Techniques for Multi-Target Recognition of FMCW Radar Signal, Proceedings of the Asia-Pacific Microwave Conference 2011, pp. 1390-1393.

Wojtkiewicz et al., Two-Dimensional Signal Processing in FMCW Radars, Instytut Podstaw Elektroniki Politechnika Warszawska, Warszawa; 6 pages [retreived on Dec. 20, 2018].

Winkler, Volker, Range Doppler Detection for Automotive FMCW Radars, Proceedings of the 4th European Radar Conference, Oct. 2007, Munich Germany; 4 pages.

Li et al., Investigation of Beam Steering Performances in Rotation Risley-Prism Scanner, Optics Express, Jun. 13, 2016, vol. 24, No. 12; 11 pages.

THORLABS Application Note, Risley Prism Scanner; 33 pages [retrieved on Dec. 20, 2018].

Simpson et al., Intensity-Modulated, Stepped Frequency CW Lidar for Distributed Aerosol and Hard Target Measurements, Applied Optics, Nov. 20, 2005, vol. 44, No. 33, pp. 7210-7217.

International Search Report and Written Opinion in corresponding International Application No. PCT/US2017/033263, dated Aug. 29, 2017; 13 pages.

International Search Report and Written Opinion in corresponding International Application No. PCT/US2017/033265, dated Sep. 1, 2017; 15 pages.

International Search Report and Written Opinion in corresponding International Application No. PCT/US2018/054992, dated Dec. 11, 2018; 12 pages.

International Search Report and Written Opinion in corresponding International Application No. PCT/US2018/049038, dated Dec. 12, 2018; 13 pages.

International Search Report and Written Opinion for International Application No. PCT/US2020/064474, dated Apr. 1, 2021.

International Search Report and Written Opinion for International Application No. PCT/US2018/057676, dated Jan. 23, 2019.

International Search Report and Written Opinion for International Application No. PCT/US2018/052849, dated May 6, 2019.

International Search Report and Written Opinion for International Application No. PCT/US2019/046800, dated Nov. 25, 2019.

Communication from EP Application No. 18773034.6 dated Sep. 13, 2021.

* cited by examiner

DETECTION SYSTEM WITH REFLECTION MEMBER AND OFFSET DETECTION ARRAY

CROSS REFERENCE TO RELATED APPLICATIONS

This application claims priority to and the benefit of U.S. Provisional Patent Application No. 62/565,373, filed on Sep. 29, 2017 and titled "LIDAR PYRAMID SCANNER CONFIGURATION WITH DIFFERENT SLOPES ON THE PYRAMID AND ILLUMINATED FROM AN ANGLE BELOW", the contents of which are incorporated herein by reference as though fully set forth herein.

Further, this application claims priority to and the benefit of U.S. Provisional Patent Application No. 62/594,284, filed on Dec. 4, 2017 and titled "LIDAR POLYGON SCANNER CONFIGURATION HAVING DIFFERENTLY SLOPED POLYGON SIDES ILLUMINATED FROM MULTIPLE SIDES", the contents of which are incorporated herein by reference as though fully set forth herein.

FIELD OF THE INVENTION

The subject disclosure relates to object detection and more particularly to detection systems for vehicles using rotating reflective members.

BACKGROUND OF THE INVENTION

Vehicles often include detection systems which can be used for collision avoidance, self-driving, cruise control, and the like. For an effective detection system, it is important to combine a wide field of view in both the horizontal and vertical direction with long range and high resolution. However, limited space and cost considerations can often limit the range and/or resolution of a detection system. Further, an individual vehicle can have limited space for placing the components of detection systems and an excessive amount of components can be unappealing esthetically.

SUMMARY OF THE INVENTION

In light of the needs described above, the subject technology relates to a compact and cost effective vehicle detection system that has a large field of view, long range, and high resolution in a compact detection system.

In at least one aspect, the subject technology relates to a detection system for a vehicle in an environment. A reflective member is positioned along an x-y plane for rotation around a rotational axis orthogonal to the x-y plane, the reflective member having a plurality of reflective sides, each of the reflective sides sloping towards the rotational axis at a slope angle different than the slope angle of at least one of the others of the reflective sides. At least one detector is positioned offset from the rotational axis and the x-y plane, an active side of the plurality of reflective sides positioned to provide a field of view between at least one detector and the environment. An actuator is configured to rotate the reflective member around the rotational axis to change the active reflective side to a different one of the plurality of reflective sides.

In some embodiments, each of the reflective sides slopes at a slope angle different than that of all of the others of the reflective sides. In some embodiments, the detector includes an array of optical receivers for a line camera. The detection system can include a LiDAR system having light transmitters and light receivers, the LiDAR system being offset from the rotational axis and the x-y plane. The light transmitters can be arranged in an array, each light transmitter configured to transmit a light beam towards the reflective member for deflection off an active reflective side of the plurality of reflective sides and into the environment. The light receivers can then also be arranged in an array, each light receiver configured to receive at least one transmitted light beam that has deflected off an object in the environment. In some embodiments, a window surrounds at least a portion of the reflective member.

In at least one aspect, the subject technology relates to a detection system for a vehicle in an environment. A reflective member is positioned along an x-y plane for rotation around a rotational axis orthogonal to the x-y plane, the reflective member having a plurality of reflective sides. Each of the reflective sides extends between a first end and a second end and slopes towards the rotational axis at a slope angle different than the slope angle of at least one of the others of the reflective sides. A first array of light transmitters is included, each transmitter configured to transmit a light beam towards the reflective member for reflection off an active reflective side of the plurality of reflective sides and into the environment. A first array of light receivers is included, each receiver configured to receive at least one transmitted light beam that has deflected off an object in the environment before returning to the detection system and deflecting off the active reflective side. The first array of light transmitters and the first array of light receivers are offset from the reflective member with respect to the x-y plane. An actuator is configured to rotate the reflective member around the rotational axis to change the active reflective side to a different one of the plurality of reflective sides.

In some embodiments a second array of light transmitters is included, each light transmitter configured to transmit a light beam towards the reflective member for reflection off a second active reflective side of the plurality of reflective sides and into the environment. A second array of light receivers can likewise be included, each light receiver configured to receive at least one light beam transmitted from the second array of light transmitters that has deflected off an object in the environment before returning to the detection system and deflecting off the second active reflective side. In some embodiments, a third array of light transmitters is included, each light transmitter configured to transmit a light beam towards the reflective member for deflection off a third active reflective side of the plurality of reflective sides and into the environment. A third array of light receivers can also be included, each light receiver configured to receive at least one light beam transmitted from the third array of light transmitters that has deflected off an object in the environment before returning to the detection system and deflecting off the third active reflective side. In some embodiments, the plurality of reflective sides includes exactly four reflective sides. The detection system can then include a fourth array of light transmitters, each light transmitter configured to transmit a light beam towards the reflective member for deflection off a fourth active reflective side of the plurality of reflective sides and into the environment. The detection system can also include a fourth array of light receivers, each light receiver configured to receive at least one light beam transmitted from the fourth array of light transmitters that has deflected off an object in the environment before returning to the detection system and reflecting off the fourth active reflective side.

In some embodiments, a lens is positioned between the first array of light receivers and the reflective member, the lens collimating the transmitted light beams before receipt by the light receivers. In some embodiments, a lens is positioned between the first array of light transmitters and the reflective member, the lens collimating the transmitted light beams before deflection off the reflective member. The detection system can include a beam splitter positioned between the first array of light transmitters and the reflective member. The beam splitter can be a polarizing wedge configured to deflect the returning light beams from a first optical axis of the light transmitters to a second optical axis of the light receivers.

In some embodiments, a mirror is positioned below the reflective member with respect to the rotational axis and offset from the rotational axis, the mirror deflecting light between the reflective member and both the first array of light transmitters and the first array of light receivers. A lens can be positioned between the first array of light transmitters and the mirror, the mirror including an internal section of a different slope and the lens directing the transmitted light beams towards the internal section. In some embodiments the first array of light transmitters and the first array of light receivers are positioned below the reflective member with respect to the rotational axis.

In some embodiments, a first reflective side of the plurality of reflective sides is sloped to deflect transmitted light beams into an upper scanning zone of the environment and a central scanning zone of the environment. A second reflective side of the plurality of reflective sides is then sloped to deflect transmitted light beams into the upper scanning zone, the central scanning zone, and a lower scanning zone of the environment. Additionally, a third reflective side of the plurality of reflective sides is sloped to deflect transmitted light beams into the central scanning zone and the lower scanning zone.

In some embodiments, a first reflective side of the plurality of reflective sides is sloped to deflect transmitted light beams into an upper scanning zone of the environment. A second reflective side of the plurality of reflective sides is then sloped to deflect transmitted light beams into a central scanning zone of the environment. Additionally, a third reflective side of the plurality of reflective sides is sloped to deflect transmitted light beams into a lower scanning zone of the environment.

In some embodiments, a first reflective side of the plurality of reflective sides is sloped to deflect a first set of transmitted light beams into the environment, a first set of gaps forming between pairs of deflected first set of transmitted light beams. A second reflective side of the plurality of reflective sides is then sloped to deflect a second set of transmitted light beams into the environment within the first set of gaps, a second set of gaps forming between pairs of the deflected first set of transmitted light beams and the deflected second set of transmitted light beams. Additionally, a third reflective side of the plurality of reflective sides is sloped to deflect a third set of transmitted light beams into the environment within the first set of gaps and second set of gaps.

In some embodiments, the first array of light transmitters and the first array of light receivers are offset from the reflective member with respect to the rotational axis. The first array of light transmitters and the first array of light receivers can share an optical axis. In some embodiments, the reflective sides slopes at a slope angle different than all of the others of the reflective sides.

In at least one aspect, the subject technology relates to a detection system for a vehicle in an environment. A reflective member is positioned for rotation around a rotational axis, the reflective member having a plurality of reflective sides. Each of the reflective sides extends between a first end and a second end and slopes towards the rotational axis at a slope angle different than the slope angle of the others of the reflective sides. The detection system includes a LiDAR system having at least one light transmitter and at least one light receiver. The LiDAR system is positioned below the reflective member with respect to a ground surface. An active side of the plurality of reflective sides is positioned to provide a field of view between the LiDAR system and the environment. An actuator is configured to rotate the reflective member around the rotational axis to change the active reflective side to a different one of the plurality of reflective sides.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
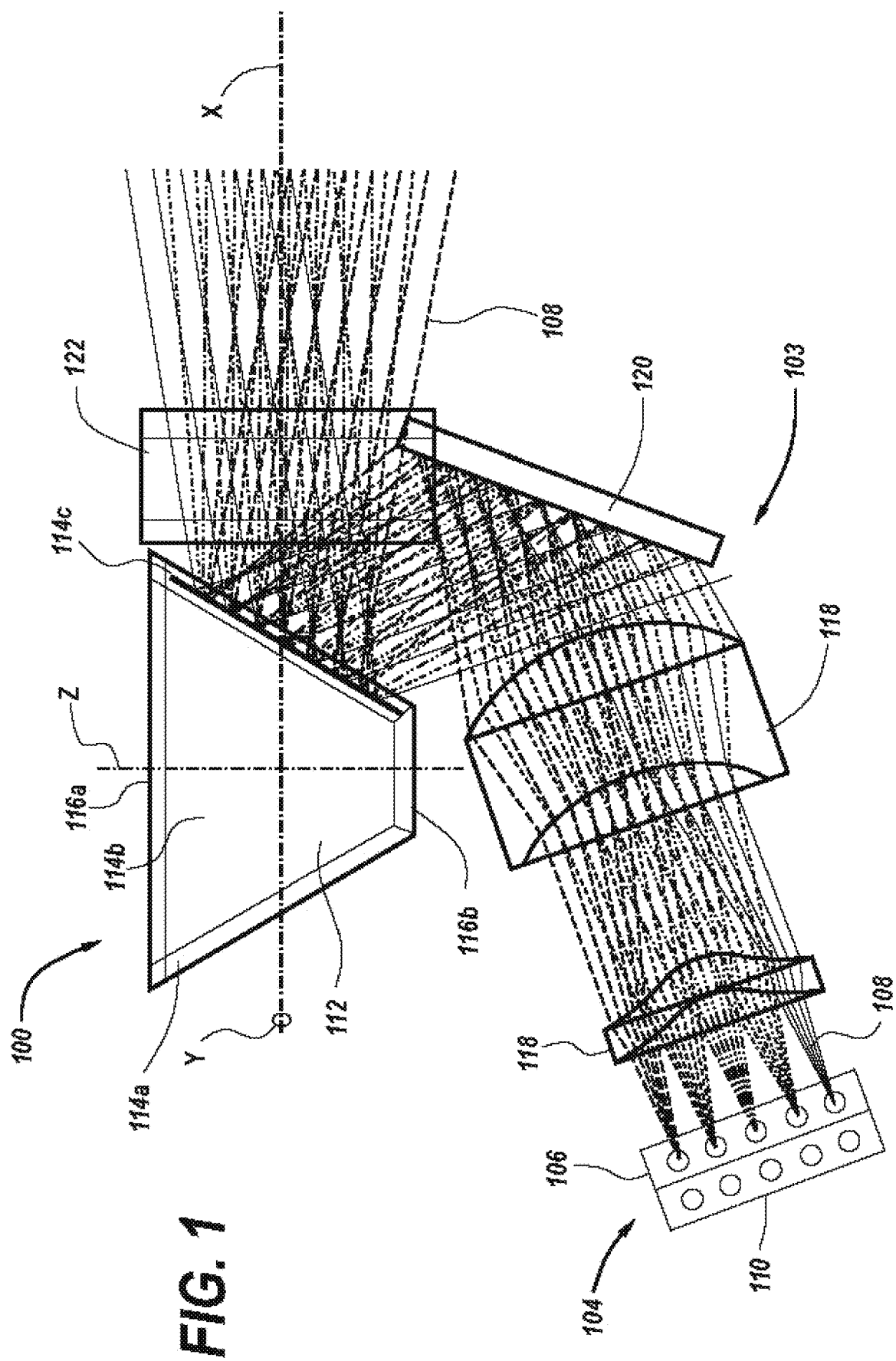
FIG. 1 is a side view of a detection system for a vehicle in accordance with the subject technology.

The subject technology overcomes many of the prior art problems associated with vehicle detection systems. In brief summary, the subject technology provides a detection system that combines rotating at least one reflective member which interacts with an offset detector array to yield a good field of view and good range and resolution. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1, a detection system for a vehicle in accordance with the subject technology is shown generally at 100. The detection system 100 can be mounted on or within a vehicle (not distinctly shown) and can be used generally to gather information and generate data on the surrounding environment. The detection system 100 includes a reflecting member 102 which interacts with a LiDAR system 103 to view objects in the environment around the vehicle. The LiDAR system 103 includes the necessary components for target detection using LiDAR as are found in typical LiDAR systems known in the art. In the embodiment of FIG. 1, the LiDAR system 103 has a detector array 104 with light transmitters 106 and receivers 110, lenses 118, and a reflective mirror 120, as discussed in more detail below. Each transmitter 106 is configured to transmit a light beam 108. The light transmitters 106 can include laser diodes configured to generate pulsed lasers or light beams 108 for reflection off objects within the environment, or other similar known transmitter for a LiDAR system 103.

Meanwhile, each light receiver 110 is configured to receive the light beams 108 after they have reflected off an object within the environment. The light receivers 110 are optical detection devices, or sensors, as are known for detecting light in LiDAR systems. In some cases, only one light receiver 110 is used, however the embodiments shown relate to light receivers 110 arranged in a column or array. Generally, the light receivers 110 are arranged such that they receive a light beam 108 from a corresponding light transmitter 106 which has reflected off an object in the environment. The reflected light beams 108 are then converted by the light receivers 110 into electrical signals. Processing circuitry (not distinctly shown) then processes and stores data related to the objects within the environment based on the electrical signals. In particular, the LiDAR system 103 generates 3D range data on objects within the environment.

A reflective member 112 having a plurality of reflective sides 114a-c (generally 114) formed from reflective metal or dielectric material facilitates the interaction between the LiDAR system 103 and the environment. Notably, at least one reflective side is hidden from view in FIG. 1. An actuator (not distinctly shown) rotates the reflective member 112 around a rotational axis "z" to change the field of view of the LiDAR system 103. The reflective sides 114 of the reflective member 112 slope, between a wide end 116a and a narrow end 116b, towards the rotational axis z. Each reflective side 114 slopes at a different angle than the others of the reflective sides 114 such that the LiDAR system 103 canvases a different field of view (or improves resolution by canvassing the same field of view at a slightly different location) when reflecting off each of the reflective sides 114. Notably, in other embodiments, each reflective side 114 slopes at a slope angle different than one, but not all, of the other reflective sides 114.

In the embodiment of FIG. 1, the reflective member 112 is positioned along a central x-y plane. The reflective member 112 can also be positioned on the vehicle such that the x-y plane is parallel to the ground surface. The arrays of light transmitters 106 and receivers 110 are positioned offset from the x-y axis, and in some cases, below the reflective member 112 with respect to the ground. The arrays of light transmitters 106 and receivers 110 are also offset from the rotational axis (i.e. shown here as the z axis) of the reflective member 112. The sloping sides 114 of the reflective member 112 slope towards the z axis such that the reflective sides at least partially face in the direction of the LiDAR system 103. As the light beams 108 are transmitted from the light transmitters 106, the light beams 108 pass through two lenses 118. Notably, the terms "lens" or "lenses" are used throughout and it should be understood that each lens 118 may have several pieces of glass of differing shapes, thickness, and/or curvature. The term "lens" is not limited to a single piece of glass. In general, the lens 118 acts as a collimating lenses to orient the transmitted (and returning) light beams 108. After passing through the lens 118, the transmitted light beams 108 deflect off a mirror 120 formed from reflective metal which redirects the beams 108 towards the reflective member 112. In general, the reflective member 120 allows the other components of the LiDAR system 103 to be positioned offset from and/or below the x-y axis of the reflective member 112 and in some cases, offset form the rotational z axis as well. The light beams 108 then deflect off the current active side (in this case, reflective side 114c) of the reflective member 112. The active side refers to the reflective side 114 which is in line with the current optical path of the LiDAR system 103. After deflecting off the reflective member 112, the light beams 108 pass through a window 122 into the environment. The window 122 can be a windshield of the vehicle or can be a separate window oriented around the reflective member 112 specifically designed to protect the detection system 100. After deflecting off an object in the environment, the light beams 108 pass back through the window 122. The returning light beams 108 can then follow substantially the same optical path as the initially transmitted light beams 108, or can follow a slightly different path as described in more detail below. The arrays of light transmitters 106 and light receivers 110 can each include multiple rows as described to increase range and/or resolution.

By positioning the array of light transmitters 106 and receivers 110 offset from the reflective member 112 with respect to both the rotational axis z and the x-y plane, the detection system 100 generates a large field of view for a rotating reflective member 112 having at least 3 sides. Since transmitters and receivers are often cost drivers for detection systems, enlarging the field of view by effectively positioning the components of the LiDAR system 103 can result in significant cost savings. Additionally, as described in more detail below, proper placement of the components of the LiDAR system 103 can also improve resolution.

Notably, while FIG. 1 is described with respect to a LiDAR system 103 and a detector array 104, it should be noted that sometimes the detector array 104 can instead be a line camera used to generate a high resolution video stream of the environment. In other cases, the LiDAR system 103 can be used in conjunction with a line camera by positioning the line camera in any of the orientations of the light receivers 110 as identified herein.

Figure 2:
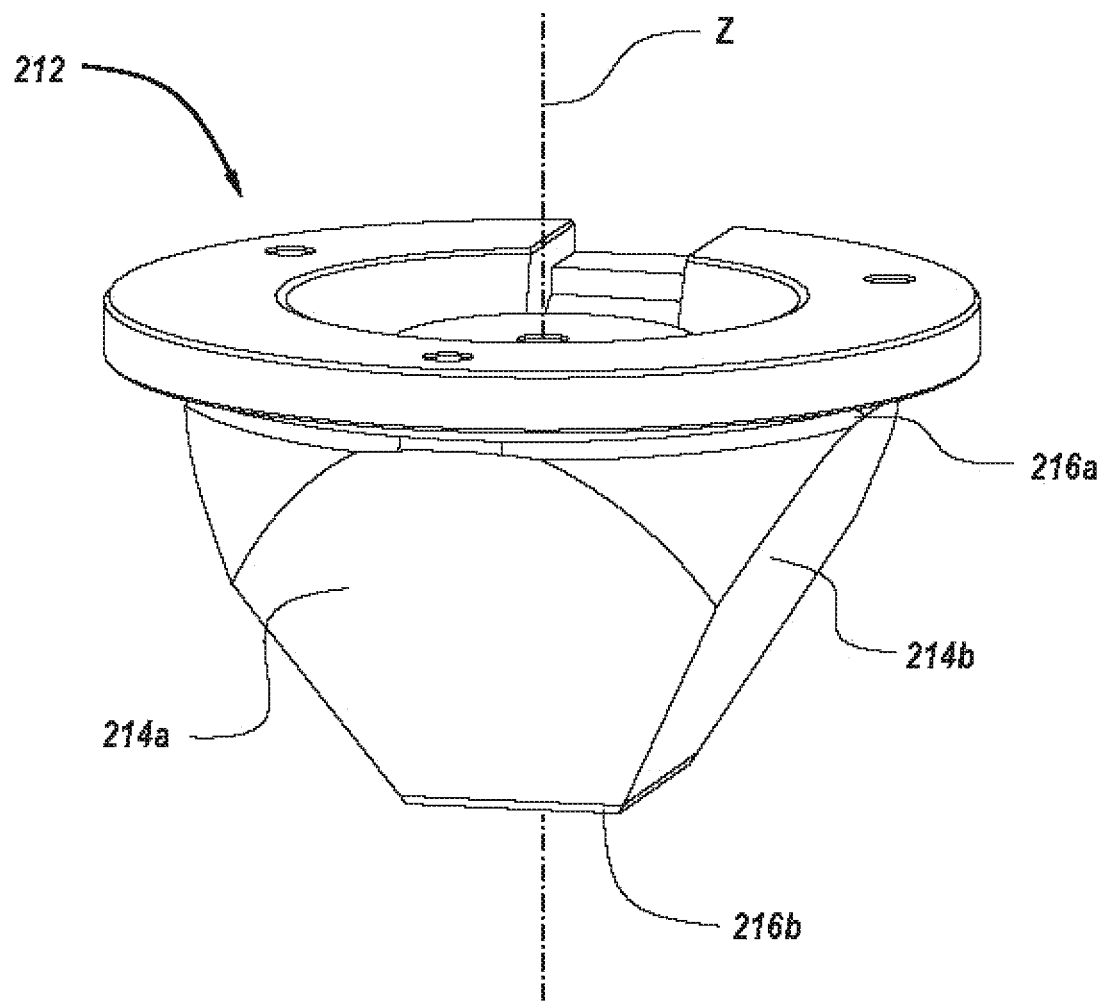
FIG. 2 is a perspective view of a reflective member for a detection system for a vehicle in accordance with the subject technology.

Referring now to FIG. 2, a perspective view of a reflective member 212 is shown, the other components of the corresponding detection system having been omitted for simplicity. The reflective member 212 can function within a detection system similar to the reflective member 112 discussed above. In the embodiment of FIG. 2, the reflective member 212 has 4 sides, although only a first side 214a and second side 214b (generally 214) are shown. Each of the sides 214, including the sides not shown, slope from the wide end 216a towards the narrow end 216b at a different slopes than the other sides 214. An actuator rotates the reflective member 212 around the z axis, changing the field of view of light transmitters interacting with the sides 214 and causing each of the sides 214 to interact with the light transmitters in turn.

Figure 3:
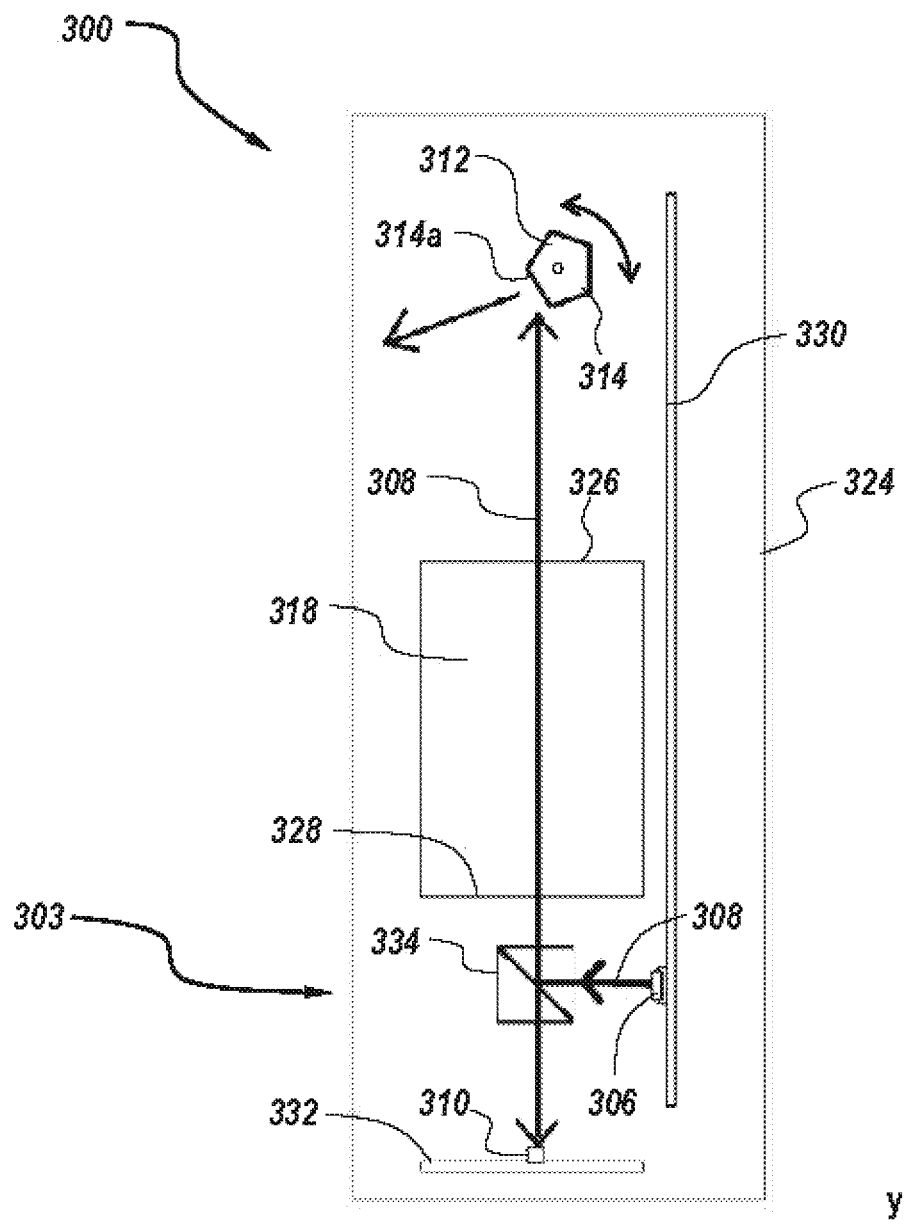
FIG. 3 is an overhead view of a detection system for a vehicle in accordance with the subject technology.

Referring now to FIG. 3, an overhead view of a detection system in accordance with the subject technology is shown generally at 300. The detection system 300 can function similarly to the detection system 100, with the components of the LiDAR system 303 being offset from the reflective member 312 with respect to both the z axis and x-y plane. Further, as in the detection system 100, the components of the LiDAR system 303 interact with a reflective mirror (not shown) which allows the LiDAR system 303 to interact with the reflective member 312 and obtain a field of view of the environment. All of the components of the detection system 300 can be fixed within a shared housing 324 as shown, or can be independently attached on or within the vehicle.

In the detection system 300, the light transmitters 306 and light receivers 310 are arranged in vertical columns along the z axis, offset from the reflective member 312. Each individual transmitter 306 can have a corresponding receiver 310 at a shared location along the z axis. The transmitters 306 and receivers 310 share an optical path on a distal side 326 of the lens 318. However, on a proximate side 328 of the lens 318, the transmitters 306 and receivers 310 are positioned offset from one another along the x-y plane. In particular, the transmitters 306 are positioned on a first support 330 which runs along the y axis while the receivers 310 are positioned on a second support 332 which runs along the x axis, perpendicular to the first support 330. The transmitters 306 and receivers 310 both face a beam splitter 334 which is arranged along the optical axis.

The beam splitter 334 can be one of the many types of known beam splitters, such as polarizing or non-polarizing. Whether the light is reflected or allowed to pass through the beam splitter 334 can be based on a certain property of the light, such as polarization. In other cases, the beam splitter 334 can simply reflect a portion of all light that hits it while allowing a portion of the light to pass through. As shown, the beam splitter 334 is configured to redirect some light while allowing other light to pass through. The light transmitters 306 transmit light beams 308 parallel to the x-axis. The transmitted light beams 308 are then deflected, by beam splitter 334 along the y axis, through the lens 318 and to the reflective member 312. The light beams 308 then hit the active side 314a of the reflective member 312 and pass into the environment around the vehicle. After deflecting off objects in the environment, the light beams 308 return, deflect off the active side 314a of the reflective member 312, and pass through the lens 318 along the optical axis. The returning light beams 308 then approach the beam splitter 334 traveling parallel to the y axis. The beam splitter 334 allows at least some of the returning light beams 308 to pass therethrough without deflection for receipt by the light receivers 310 which are positioned behind the beam splitter 334 with respect to the lens 318. In this way, the detection system 300 is configured to allow the transmitters 306 and receivers 310 to share an optical axis. An actuator continues to rotate the reflective member 312 as the detection system 300 operates to change the active reflective side 314a. Since each reflective side 314 has a different slope, changing the active reflective side changes the field of view or scan area of the detection system 300.

Figure 4:
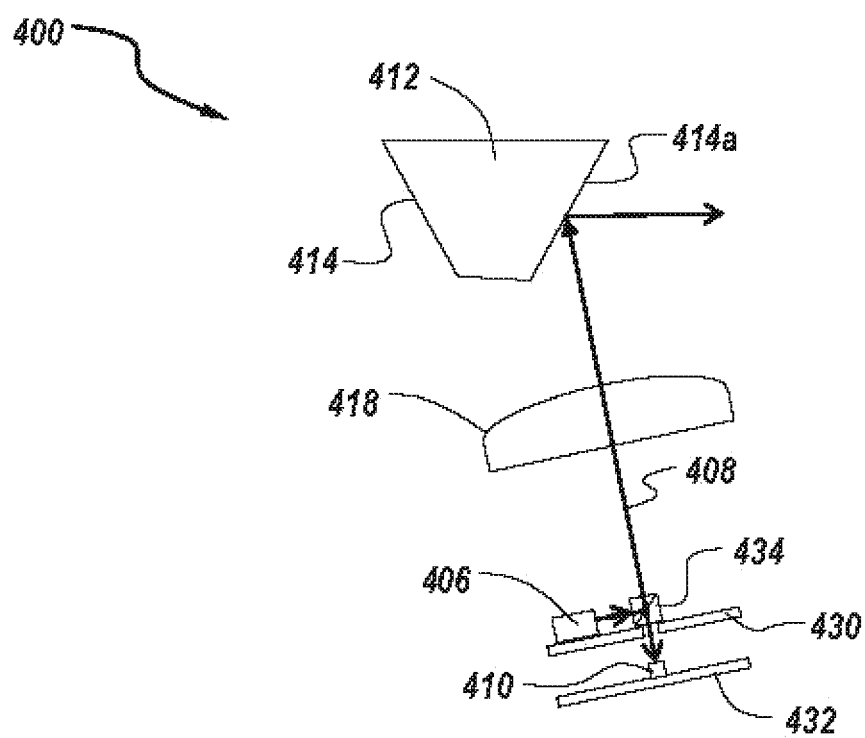
FIGS. 4-6 are side views showing various orientations for select components for a detection system in accordance with the subject technology.
Figure 5:
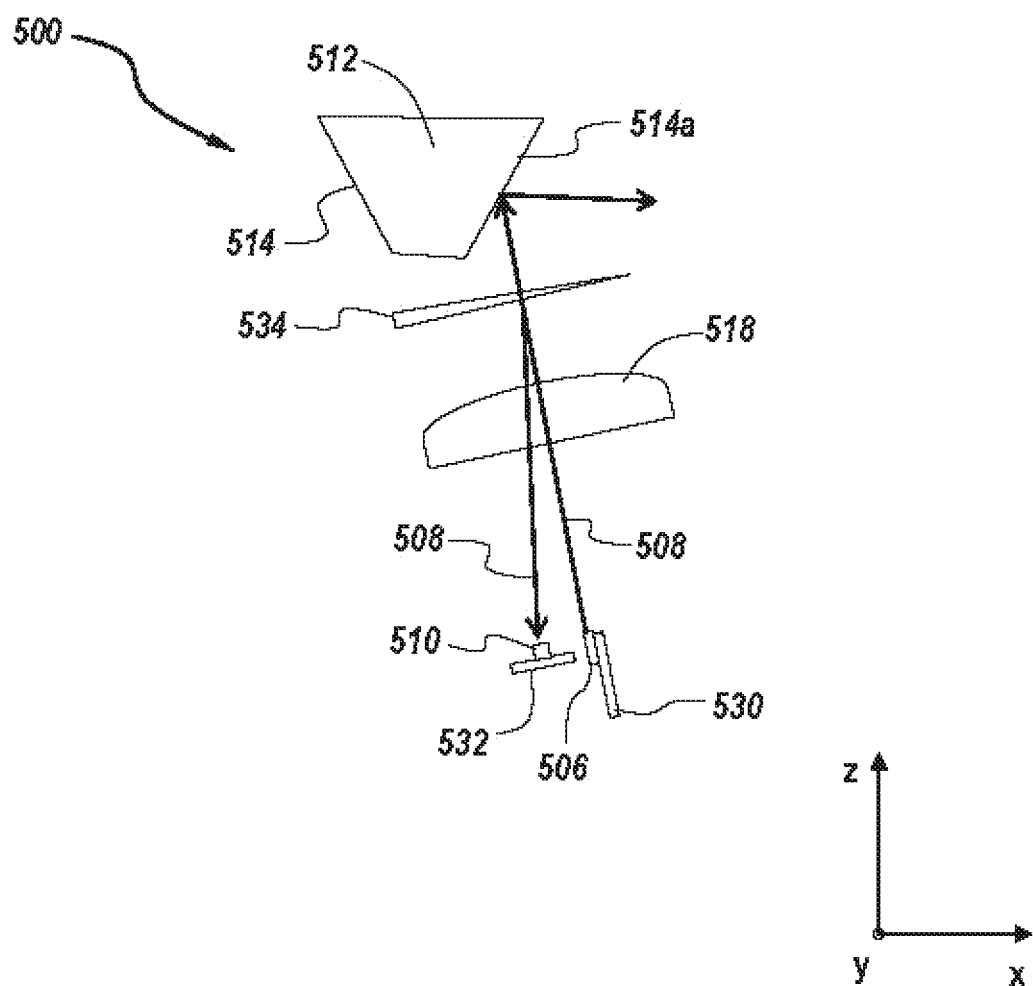
Figure 6:
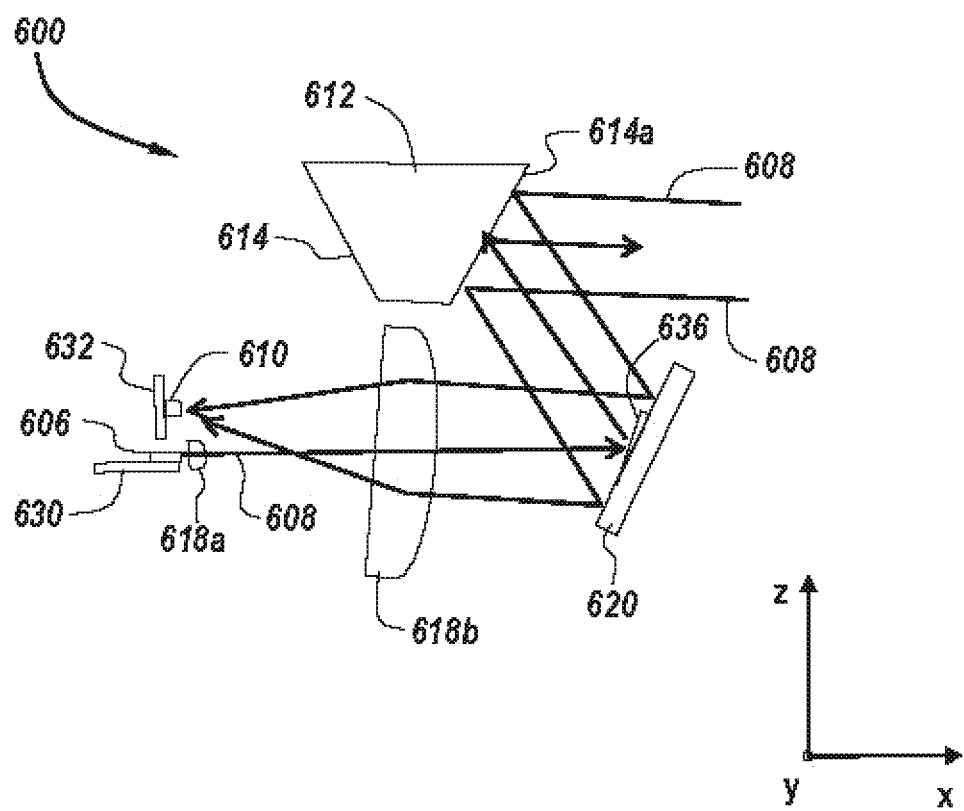

Referring now to FIGS. 4-6, side views of simplified component arrangements for detection systems in accordance with the subject technology are shown. The detection systems of FIGS. 4-6 function similarly to the other detection systems shown herein except where otherwise shown and discussed. In each embodiment, the components of the LiDAR systems are positioned offset from the reflective member both vertically and horizontally (per the orientations shown). This allows for increased angles of output beams, enlarging the field of view of the detection system.

Referring now to FIG. 4, the first support 430 and the second support 432 are arranged parallel to one another, with the first support 430 being proximate to the lens 418 and the second support 432 being distal to the lens 418. As in other embodiments, the light transmitters 406 and receivers 410 are arranged in columns. The light transmitters 406 initially transmit light beams 408 perpendicular to the lens 418 and away from the reflective member 412. The beam splitter 434 acts as a polarizing cube beam splitter which redirects the light beams 408 from the light transmitters 406, sending the light beams 408 through the lens 418 to deflect off the active side 414a of the reflective member 412. The transmitter 406 lasers are usually optically polarized, so the polarizing beam splitter can provide low losses of outgoing light. After reflecting off objects in the environment, the light beams 408 return through the lens 418 along the same optical path. The beam splitter 434 is configured to allow at least some of the returning light beams 408 to pass therethrough for receipt by the light receivers 410.

Turning to FIG. 5, the light transmitters 506 and receivers 510 are positioned offset from one another such that different optical axes are used on the proximate side (i.e. the side closest to the light transmitters 506 and receivers 510) of a polarizing wedge or beam splitter 534. The beam splitter 534 allows transmitted light beams 508 to pass therethrough. After the light beams 508 deflect off objects within the environment, the light beams 508 initially return along the same optical path of the transmitted light beams 508 until reaching the beam splitter 534. The beam splitter 534 is configured to deflect a portion of the returning light beams 508 to a new optical path for receipt by the array of light receivers 510.

Referring now to FIG. 6, the light transmitters 606 and receivers 610 are positioned next to one another and facing the lens 618. As with other embodiments, the light transmitters 606 and receivers 610 are offset from the rotational axis of the reflective member and offset with respect to the x-y plane. The light transmitters 606 transmit light beams 608 through two lenses 618 and towards the mirror 620. The mirror 620 has an internal section 636 which is sloped differently than the mirror 620 and effectively acts as a second mirror with a different slope. The first lens 618a is designed to collimate or direct the transmitted light beams 608 particularly towards the internal section 636 of the mirror 620. The internal section 636 interacts with the transmitted light beams 608 from the light transmitters 606 and deflects the light beams 608 towards the reflective member 612. The active side 614a of the reflective member 612 then deflects the light beams 608 into the environment. After the light beams 608 deflect off objects in the environment, the light beams 608 return to reflective off the active side 614a of the reflective member 612. The returning light beams 608 then strike the mirror 620 in a broader spread than the outgoing light beams 608, reflecting off the entire mirror 620 surface. The second lens 618b then redirects the incoming light beams 608 for receipt by the light receivers 610. In the embodiment of system 600, effectively using the mirror 620 as a beam splitter in this way can result in higher efficiency than the beam splitter setups shown in other embodiments as less light is wasted when emitting light and collecting returning light.

Figure 7A:
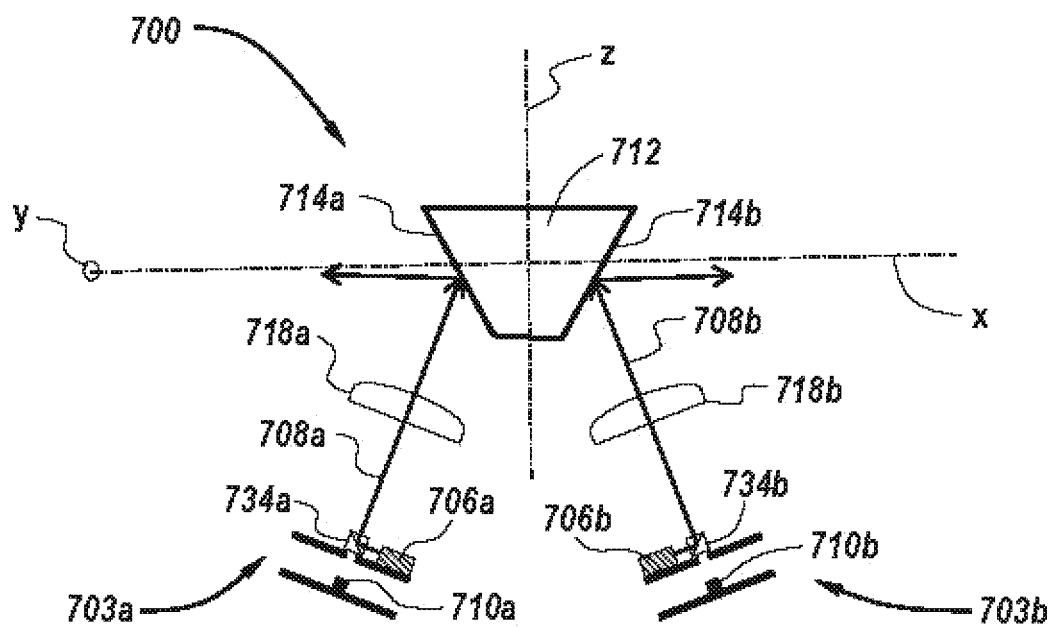
FIGS. 7A and 7B are side and overhead views, respectively, of a vehicle detection system in accordance with the subject technology.
Figure 7B:
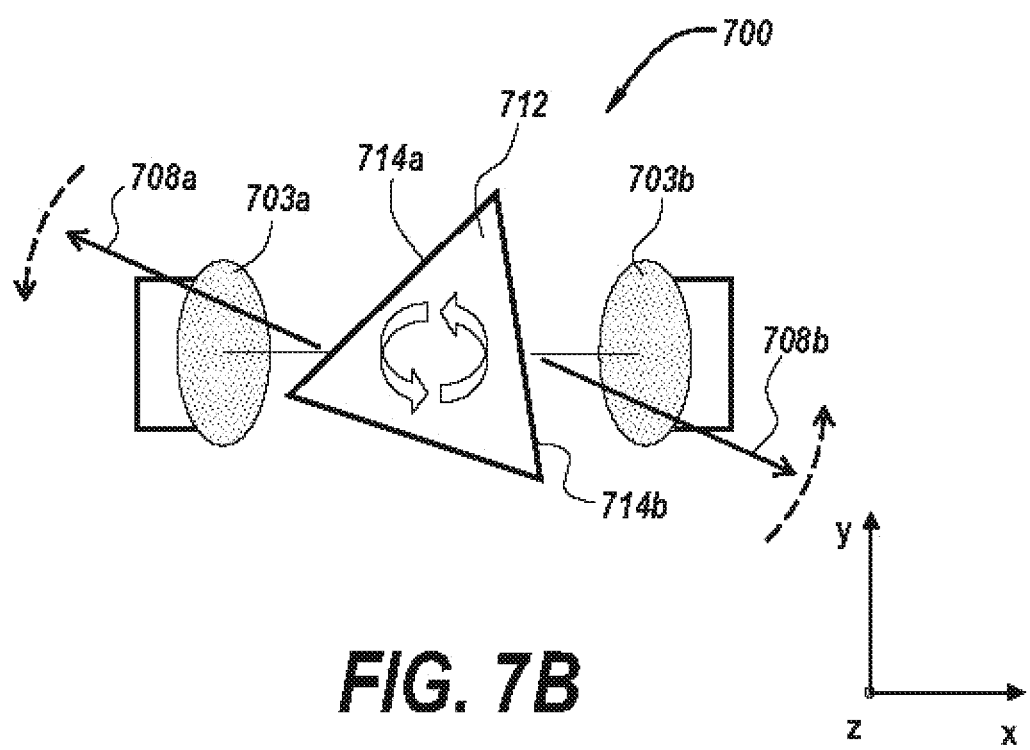

Referring now to FIGS. 7A-7B, a simplified version of a detection system 700 in accordance with the subject technology is shown. The detection system 700 is similar to the other detection systems discussed herein, the main difference being that two different LiDAR systems 703*a*, 703*b* (generally 703) are included. Using a single rotating reflective member 712 with multiple sides 714 which interact with different LiDAR systems 703 allows for an optimized detection system 700, as other separate detection systems are not required to obtain a robust field of view of the environment.

Each LiDAR system 703 has an array of light transmitters 706 and receivers 710 and a lens 718. The LiDAR systems 703 can also include beam splitters, reflective mirrors, and any other components discussed with respect to the other LiDAR systems shown herein. Further, each LiDAR system 703 can function, and be configured similarly to, the individual LiDAR systems discussed herein. The two LiDAR systems 703 are positioned on different sides of the reflective member 712 and offset from the reflective member 712 with respect to the x-y plane. The system 700 is able to illuminate both a first and second active side 714*a*, 714*b* of the reflective member 712 simultaneously, the active sides 714*a*, 714*b*, being different sides of the reflective member 712 and therefore facing different areas of the environment and being sloped differently. This allows for simultaneous field of view of different areas in the surrounding environment.

Figure 8:
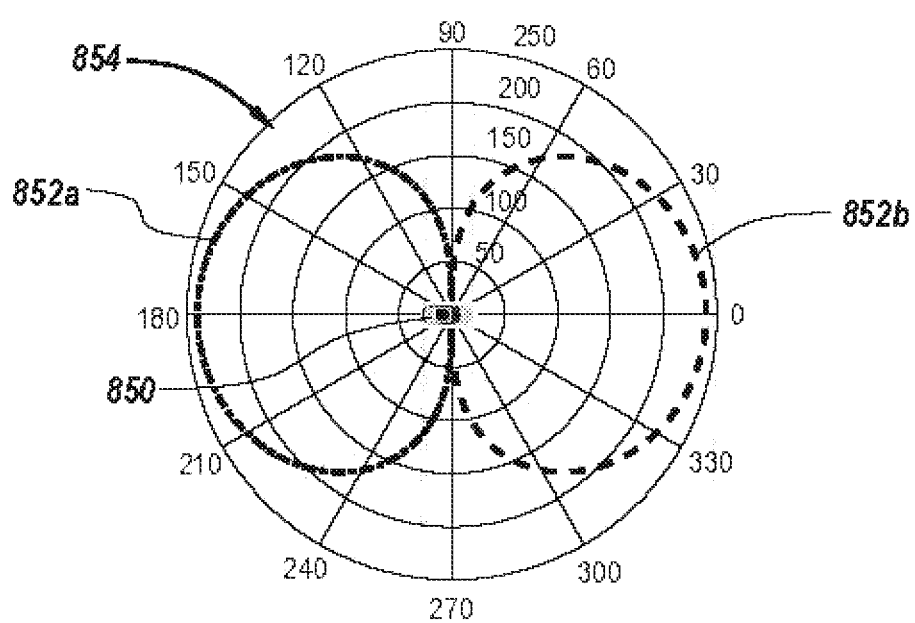
FIG. 8 is an overhead diagram of the field of view and range of a vehicle using the detection system of FIGS. 7A-7B.

Some of the advantages of the system 700 can be seen in FIG. 8. In FIG. 8, an overhead diagram of the field of view (or coverage) of a vehicle 850 using the LiDAR system 700 to detect objects in an environment 854 is shown. In particular, only a portion of the field of view is shown in FIG. 8, that portion being the range as a function of angle in the azimuth. The field of view of the first LiDAR system 703*a* is represented by reference numeral 852*a* while the field of view of the second LiDAR system 703*b* is represented by reference numeral 852*b*. Each LiDAR system 703 forms a generally circular field of view with respect to the azimuth direction on their respective side of the reflective member 712. The circular field of view is realized as the reflective member 712 rotates, causing the light transmitters 706 to be directed to different points within the environment (changing the field of view horizontally). Similarly, as the light transmitters 706 are exposed to different reflective sides 714 with different slopes, the field of view is expanded, or resolution increased, vertically. As shown in FIG. 8, placing the two LiDAR systems 703 on either side of the reflective member 712, and vertically offset from the reflective member 712, can provide a total field of view (852*a* and 852*b*) of the environment 854 that is substantially 360 degrees around the vehicle 850. Notably, the number of LiDAR systems 703 that can be used is only limited by the total number of reflective sides of the reflective member (i.e. one LiDAR system 703 per reflective side).

Figure 9:
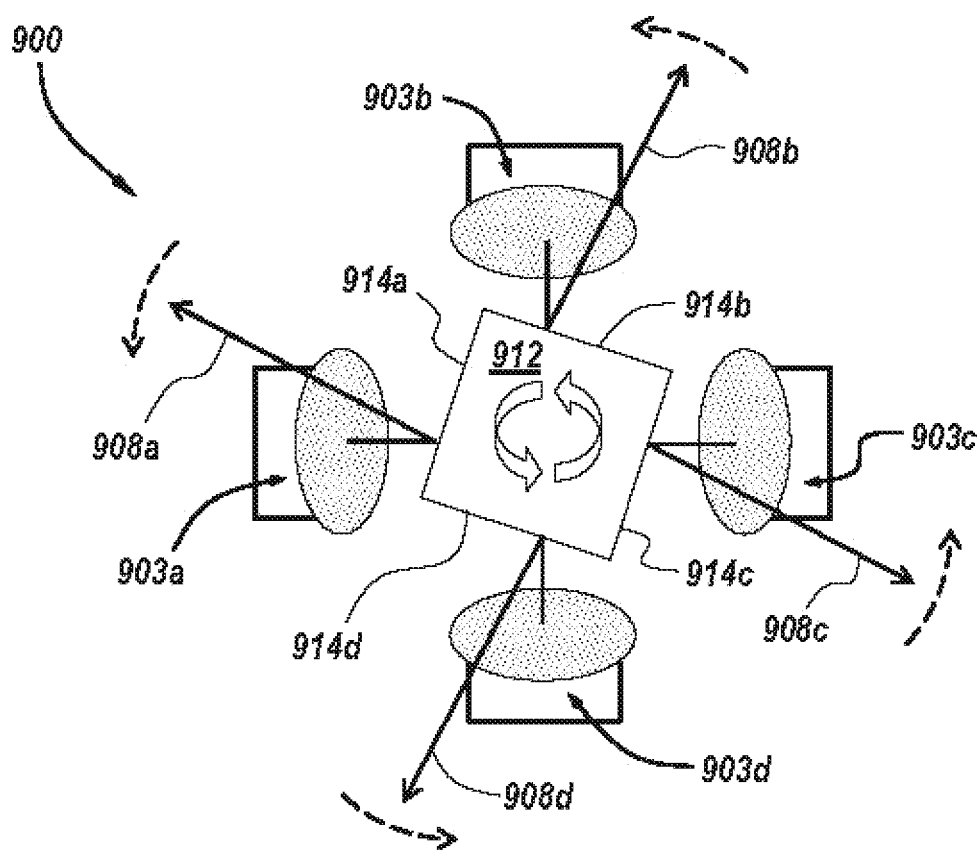
FIG. 9 is an overhead view of a vehicle detection system in accordance with the subject technology.

Referring now to FIG. 9, another embodiment of a detection system 900 in accordance with the subject technology is shown. The detection system 900 functions similarly to the detection system 700 except that instead of two LiDAR systems 703*a*, 703*b*, four LiDAR systems 903*a*-903*d* (generally 903) are included. Since the reflective member 912 has four reflective sides 914*a*-914*d* (generally 914), each reflective side 914 can simultaneously interact with one of the LiDAR systems 903, serving as an active side and providing a field of view to a corresponding area of the surrounding environment.

Figure 10:
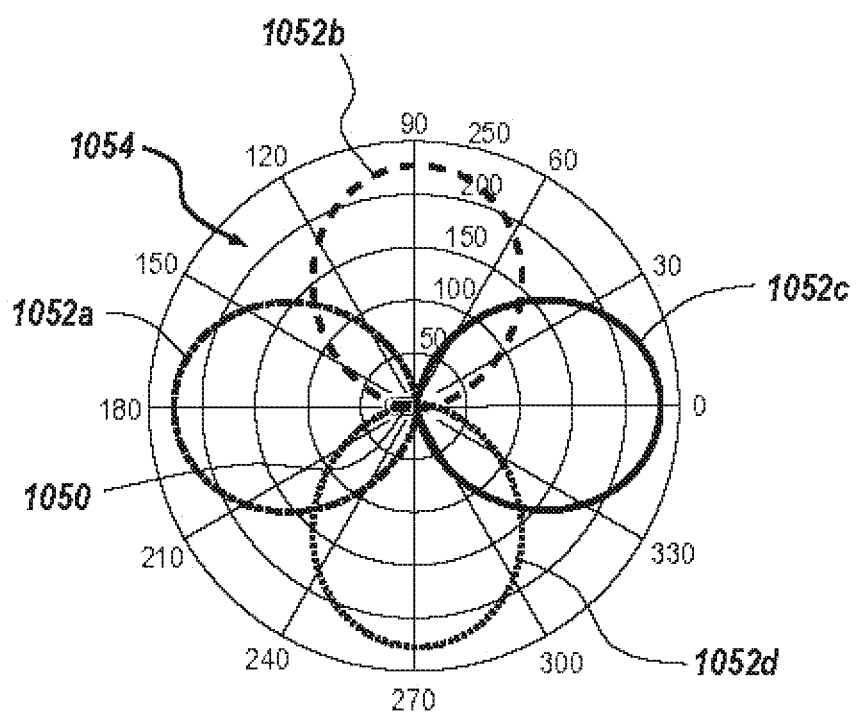
FIG. 10 is an overhead diagram of the field of view and range of a vehicle using the detection system of FIG. 9.

Turning to FIG. 10, a diagram of the field of view (or coverage) of a vehicle 1050 using the LiDAR system 900 to detect objects in an environment 1054 is shown. Again, as in the discussion of FIG. 8, the particular portion of the field of view shown relates to the range in the azimuth direction. Fields of view 1052*a*-1052*d* (generally 1052) extend from the detection system 900 of the vehicle, each corresponding to a respective LiDAR system 903. Again, these substantially circular fields of view 1052 are formed as an actuator rotates the reflective member 912, changing the angle between each LiDAR systems 903 and the environment. By placing the LiDAR systems 903 on opposite sides of the reflective member 912, a 360 degrees total field of view 1052 is obtained around the vehicle 1050. This field of view 1052 is further improved by the fact that the LiDAR systems 903 are all vertically offset from (i.e. offset along the x-y plane), or below, the reflective member 912.

Notably, in other embodiments, the reflective member 912 can have a different number of sides and/or a different number of LiDAR systems 903 can be used. For example, in some embodiments, anywhere from 3-6 reflective sides 914 on a reflective member 912 have been found to be effective. Further, the number of LiDAR systems 903 that can be effectively used is only limited by the number of reflective sides 914 of the reflective member 912. Thus, if a reflective member 912 had six different reflective sides 914, any number of LiDAR systems 903 from one to six could be used.

Figure 11:
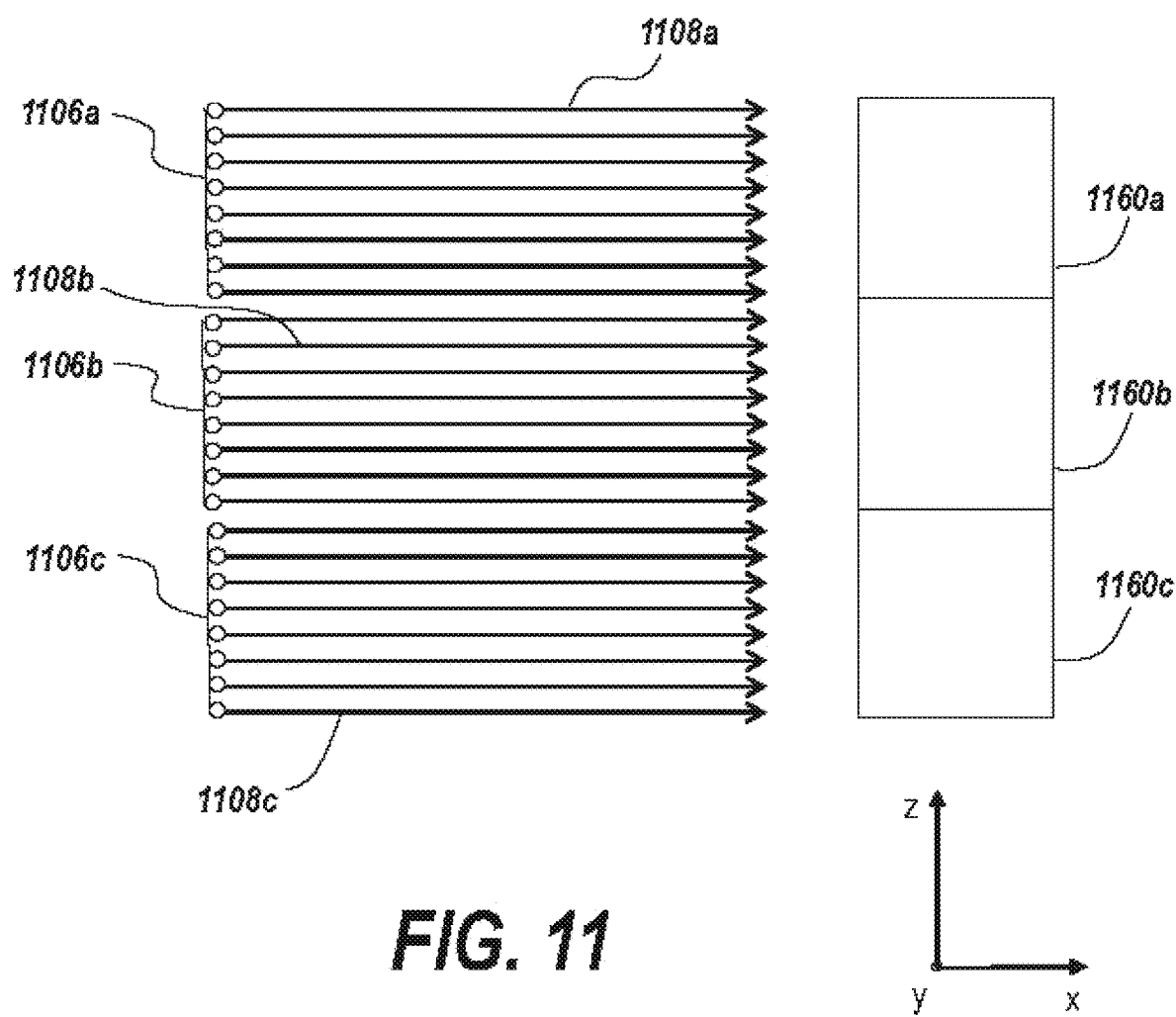
FIGS. 11-13 are diagrams showing various light beam orientations resulting from differently sloped sides of a reflective member in accordance with the subject technology.
Figure 12:
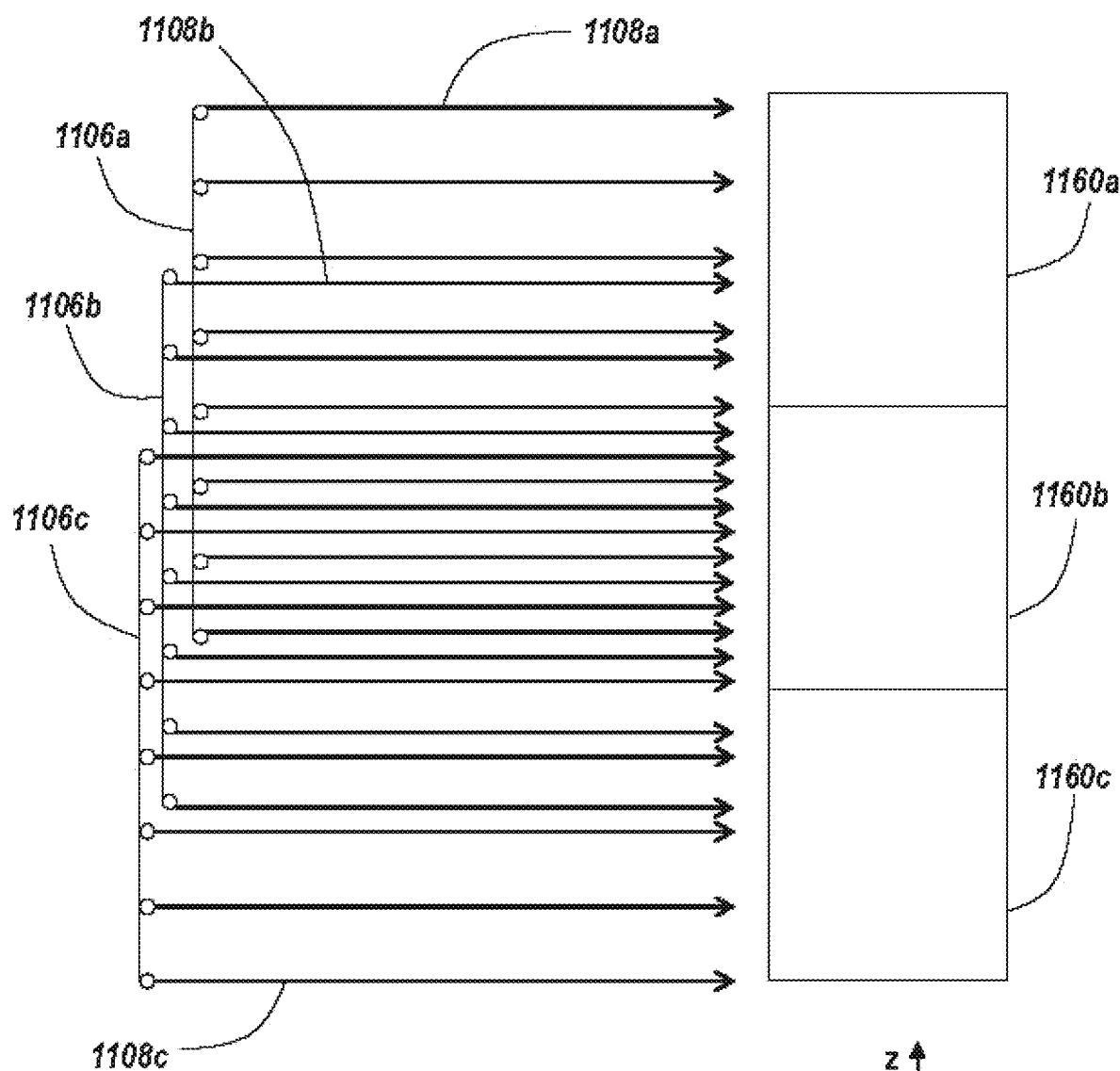
Figure 13:
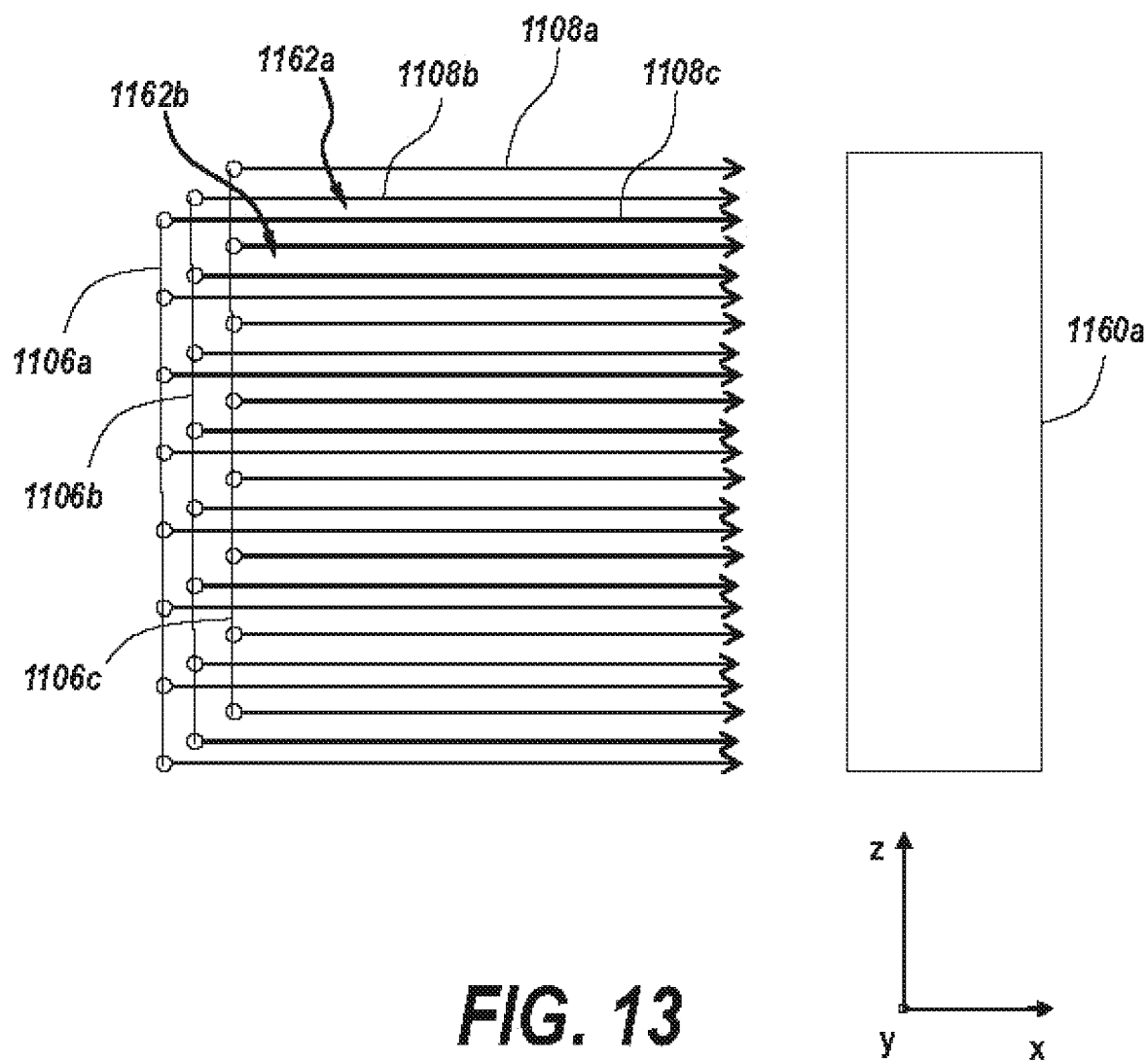

Referring now to FIGS. 11-13, the path taken by light beams 1108 after deflecting off the reflective member into the environment are shown. The three arrays of light transmitters 1106*a*-1106*c* (generally 1106) are all the same array of light transmitters 1106, FIGS. 11-13 merely depicting how the light beams 1108*a*-1108*c* are deflected to different areas within the environment when a different reflective side of the reflective member interacts with the light transmitters 1106. As such, the light transmitters 1106 themselves are not actually moving, rather their light is directed to different areas of the environment as the reflective member moves. The embodiment shown represents three different paths of the light beams 1108*a*-*c* projected from a single light transmitter 1106 at three different times. In other embodiments, multiple arrays of light transmitters may be provided so that multiple paths shown can occur simultaneously. It should be understood that for the sake of brevity, other components of the detection system are omitted in FIGS. 11-13.

In the embodiments of FIGS. 11-13, a single array of light transmitters 1106 comprised of eight individual transmitters 1106 is used to create the paths of the light beams 1108. The various reflective sides of the operative reflective member (omitted from these figures) is sloped differently to obtain a larger scan area and/or to a scan area that is more focused in a particular area. The light beams 1108 are deflected, by the active reflective side, into one or more of three different scanning zones within the environment, including a first scanning zone 1160*a*, a second scanning zone 1160*b*, and a third scanning zone 1160*c* (generally 1160). The scanning zones 1160 are used to divide the environment for easier explanation of how the light transmitters 1160 are staggered.

Referring now to FIG. 11, the reflective sides of the reflective member are sloped such the that light beams 1108 of the light transmitters 1106 cover completely different scanning zones 1160 by reflecting off different sides of the reflective member. For example, the first reflective side of the reflective member is sloped such that it reflects light beams 1108*a* from the light transmitters 1106*a* into a first scanning zone 1160*a* (or upper scanning zone) of the environment. As the reflective member rotates, the light transmitters 1106 then interact with, and deflect light off of, the second reflective side of the reflective member, as indicated by the light beams 1108*b* of light transmitters 1106*b*. The second reflective side is sloped to reflect the transmitted light beams 1108*b* into the second scanning zone 1160*b* (or central scanning zone). When the reflective member is rotated such that the third reflective side interacts with the array of light transmitters 1106*c*, the light beams 1108*c* are deflected into the environment in the third scanning zone 1160*c* (or lower scanning zone). In this way, the reflective sides are sloped to provide a maximum field of view in the vertical direction.

The arrangement shown in FIG. 11 can be accomplished by providing a reflective member with reflective sides differing in slope by substantially 5 degrees (i.e. +/−10 percent). For example, the reflective member can have three sides sloping 25 degrees, 30 degrees, and 35 degrees, respectively, with respect to the rotational axis. This can result in a vertical field of view of substantially 30 degrees. In some cases, the reflective member need not have exactly three sides, but can have a plurality of sides sloping, with each side sloping at a different angle than one (or all) of the other sides. Further, certain slope angles can be duplicated to provide greater resolution, or redundancy over a giving scanning zone 1160*b*. For example, if a side slope of 30 degrees produces the light beams 1108*b* which scan over the second scanning zone 1160*b*, a fourth side can be provided which also has a side slope of 30 degrees such that over a single rotation of the reflective member the second scanning zone 1160*b* is scanned twice. This provides greater resolution in the second scanning zone 1160*b*. In an alternative example, the reflective member can have six reflective sides, the additional three reflective sides duplicating the original side slope angles of 25 degrees, 30 degrees, and 35 degrees. Depending on the arrangement of the other components of the system, the scanning pattern shown in FIG. 11 can also be produced by sides with slopes differing between 2 and 10 degrees with respect to adjacent sides.

Referring now to FIG. 12, the reflective sides are sloped such that there is some overlap in the scanning zones 1160 each reflective side directs light beams 1108 to. In particular, the first reflective side is sloped to deflect the transmitted light beams 1108*a* into the first and second scanning zones 1160*a*, 1160*b*. The second reflective side is sloped to deflect the transmitted light beams 1108*b* into the first, second, and third scanning zones 1160*a*, 1160*b*, 1160*c*. The third reflective side is sloped to deflect the transmitted light beams 1108*c* into the second and third scanning zones, 1160*b*, 1160*c*. Thus, there is an overlap of the transmitter 1106 light beam 1108 paths coming off each reflective side in the second scanning zone 1160*b*. This provides for improved vertical resolution in the second scanning zone 1160*b*. Orienting the detection system such that the second scanning zone 1160*b* is at an elevation around the vehicle can therefore maximize resolution in the elevation around the vehicle (or around another desired elevation above the ground surface). Likewise, there is some overlap of light beams cast from different reflective sides in both the first scanning zone 1160*a* and second scanning zone 1160*c*, particularly adjacent to the second scanning zone 1160*b*. While the resolution is reduced on the outer fringes of the first and third scanning zones 1160*a*, 1160*c*, there is still some resolution even at the outermost portions of the first and third scanning zones 1160*a*, 1160*c*. This provides significant vision range in the vertical dimension while still allowing for good resolution over an area of particular interest (e.g. the second scanning zone 1160*b*).

The arrangement shown in FIG. 12 can be accomplished by providing a reflective member with reflective sides differing in slope by substantially 1.9 degrees (i.e. +/−10 percent). For example, the reflective member can have three sides sloping 28.1 degrees, 30 degrees, and 31.9 degrees, respectively, with respect to the rotational axis. This can result in a vertical field of view of 30 degrees. As discussed with respect to other embodiments, the system need not have exactly three sides, but can have a plurality of sides sloping with each side sloping at a different angle than one (or all) of the other sides. Depending on the arrangement of the other components of the system, the scanning patent shown in FIG. 12 can also be produced by sides with slopes differing between 1 to 5 degrees with respect to adjacent sides.

Referring now to FIG. 13, the reflective sides are configured such that each side has only a slightly different slope than the other sides, resulting in maximum scanning resolution over a single scanning zone 1160*a*, at the expense of some vertical range compared to the embodiments of FIGS. 11-12. To that end, the first reflective side interacts with the array of light transmitters 1106*a* to deflect the first set of light beams 1108*a* towards the scanning zone 1160*a* as shown. Since the exemplary array of light transmitters 1106*a* is comprised of eight individual transmitters, gaps 1162*a* form between pairs of individual transmitters. The slope of the second side of the reflective member is just slightly different, such that the light beams 1108*b* reflect off the second side fill in the gaps 1162*a* created between the first set of light beams 1108*a*. Additionally, a second set of gaps 1162*b* are created between the second set of light beams 1108*b* which partially surround the paths traveled by the first set of light beams 1108*a*. Finally, the third reflective side is sloped yet slightly more, as compared to the second side, such that the light beams 1108*c* fill the gaps 1162*a*, 1162*b* created by the first and second reflective sides. In this way, the embodiment of FIG. 13 provides for thorough canvassing by having reflective sides of only slightly different slopes, resulting in staggered light beams 1108 which maximize resolution in a desired area.

The arrangement shown in FIG. 13 can be accomplished by providing a reflective member with reflective sides differing in slope by substantially 0.4 degrees (i.e. +/−10 percent). In some cases a similar four sided reflective member can be used to generate a substantially overlapping field of view generated by all the sides. For example, the reflective member can have four reflective sides with slope angles of 29.6 degrees, 30 degrees, 30.4 degrees, and 30.8 degrees, respectively, with respect to the rotational axis. This results in a narrow vertical field of view of substantially 22 degrees. In other similar arrangements, slope differential between adjacent sides could also be as high as 0.8 degrees between adjacent sides. Larger numbers of light transmitters 1106 could also be used instead of the 8 light transmitters 1106 which produce the 8 light beams 1108. These additional light transmitters can be evenly spaced to create cover a large field of view despite a smaller difference in slope between the reflective sides. For example, the system can include 32 light transmitters with reflective sides that differ in slope by 0.1 to 0.2 degrees between adjacent sides.

It is notable that other nominal (i.e. average) reflective member slope angles could be used other than as described above. For example, where the embodiments discussed with respect to FIGS. 11, 12, and 13 have nominal side slope angles of 30 degrees, the reflective member could instead have sides with nominal slope angles of 45 degrees, or of some other angle.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. actuators, transmitters, receivers, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A detection system for a vehicle in an environment, comprising:
   a reflective member positioned along an x-y plane for rotation around a rotational axis orthogonal to the x-y plane, the reflective member having a plurality of reflective sides, each of the reflective sides extending between a first end and a second end and sloping towards the rotational axis at a slope angle different than the slope angle of at least one of the others of the reflective sides;
   a first array of light transmitters, each light transmitter configured to transmit a light beam towards the reflective member for reflection off a first active reflective side of the plurality of reflective sides and into the environment;
   a first array of light receivers, each light receiver configured to receive at least one transmitted light beam that has deflected off an object in the environment before returning to the detection system and deflecting off the first active reflective side;
   a second array of light transmitters, each light transmitter configured to transmit a light beam towards the reflective member for reflection off a second active reflective side of the plurality of reflective sides and into the environment;
   a second array of light receivers, each light receiver configured to receive at least one light beam transmitted from the second array of light transmitters that has deflected off an object in the environment before returning to the detection system and deflecting off the second active reflective side; and
   an actuator configured to rotate the reflective member around the rotational axis to change the first and second active reflective sides each to a different one of the plurality of reflective sides; and
   wherein the first array of light transmitters and the first array of light receivers are offset from the reflective member with respect to the x-y plane.

2. The detection system of claim 1 wherein each of the reflective sides slopes at a slope angle different than that of all of the others of the reflective sides.

3. The detection system of claim 1 further comprising:
   a third array of light transmitters, each light transmitter configured to transmit a light beam towards the reflective member for deflection off a third active reflective side of the plurality of reflective sides and into the environment; and
   a third array of light receivers, each light receiver configured to receive at least one light beam transmitted from the third array of light transmitters that has deflected off an object in the environment before returning to the detection system and deflecting off the third active reflective side.

4. The detection system of claim 3 wherein the plurality of reflective sides includes exactly four reflective sides, the detection system further comprising:
   a fourth array of light transmitters, each light transmitter configured to transmit a light beam towards the reflective member for deflection off a fourth active reflective side of the plurality of reflective sides and into the environment; and
   a fourth array of light receivers, each light receiver configured to receive at least one light beam transmitted from the fourth array of light transmitters that has deflected off an object in the environment before returning to the detection system and reflecting off the fourth active reflective side.

5. The detection system of claim 1 wherein a lens is positioned between the first array of light receivers and the reflective member, the lens collimating the transmitted light beams before receipt by the light receivers.

6. The detection system of claim 1 wherein a lens is positioned between the first array of light transmitters and the reflective member, the lens collimating the transmitted light beams before deflection off the reflective member.

7. The detection system of claim 1 wherein the first array of light transmitters and the first array of light receivers are positioned below the reflective member with respect to the rotational axis.

8. The detection system of claim 1 wherein:
   a first reflective side of the plurality of reflective sides is sloped to deflect transmitted light beams into an upper scanning zone of the environment and a central scanning zone of the environment;
   a second reflective side of the plurality of reflective sides is sloped to deflect transmitted light beams into the upper scanning zone, the central scanning zone, and a lower scanning zone of the environment; and
   a third reflective side of the plurality of reflective sides is sloped to deflect transmitted light beams into the central scanning zone and the lower scanning zone.

9. The detection system of claim 1 wherein:
   a first reflective side of the plurality of reflective sides is sloped to deflect transmitted light beams into an upper scanning zone of the environment;
   a second reflective side of the plurality of reflective sides is sloped to deflect transmitted light beams into a central scanning zone of the environment; and
   a third reflective side of the plurality of reflective sides is sloped to deflect transmitted light beams into a lower scanning zone of the environment.

10. The detection system of claim 1 wherein:
    a first reflective side of the plurality of reflective sides is sloped to deflect a first set of transmitted light beams into the environment, a first set of gaps forming between pairs of deflected first set of transmitted light beams;
    a second reflective side of the plurality of reflective sides is sloped to deflect a second set of transmitted light beams into the environment within the first set of gaps, a second set of gaps forming between pairs of the deflected first set of transmitted light beams and the deflected second set of transmitted light beams; and
    a third reflective side of the plurality of reflective sides is sloped to deflect a third set of transmitted light beams into the environment within the first set of gaps and second set of gaps.

11. The detection system of claim 1 wherein the first array of light transmitters and the first array of light receivers are offset from the reflective member with respect to the rotational axis.

12. The detection system of claim 1 wherein the first array of light transmitters and the first array of light receivers share an optical axis.

13. The detection system of claim 1 wherein each of the reflective sides slopes at a slope angle different than all of the others of the reflective sides.

14. A detection system for a vehicle in an environment, comprising:
   a reflective member positioned along an x-y plane for rotation around a rotational axis orthogonal to the x-y plane, the reflective member having a plurality of reflective sides, each of the reflective sides extending between a first end and a second end and sloping towards the rotational axis at a slope angle different than the slope angle of at least one of the others of the reflective sides;
   a first array of light transmitters, each light transmitter configured to transmit a light beam towards the reflective member for reflection off an active reflective side of the plurality of reflective sides and into the environment;
   a first array of light receivers, each light receiver configured to receive at least one transmitted light beam that has deflected off an object in the environment before returning to the detection system and deflecting off the active reflective side;
   an actuator configured to rotate the reflective member around the rotational axis to change the active reflective side to a different one of the plurality of reflective sides; and
   a beam splitter positioned between the first array of light transmitters and the reflective member,
   wherein the beam splitter is a polarizing wedge configured to deflect the returning light beams from a first optical axis of the light transmitters to a second optical axis of the light receivers.

15. The detection system of claim 14 wherein the first array of light receivers includes an array of optical receivers for a line camera.

16. The detection system of claim 14 further comprising a window surrounding at least a portion of the reflective member.

17. A detection system for a vehicle in an environment, comprising:
   a reflective member positioned along an x-y plane for rotation around a rotational axis orthogonal to the x-y plane, the reflective member having a plurality of reflective sides, each of the reflective sides extending between a first end and a second end and sloping towards the rotational axis at a slope angle different than the slope angle of at least one of the others of the reflective sides;
   a first array of light transmitters, each light transmitter configured to transmit a light beam towards the reflective member for reflection off an active reflective side of the plurality of reflective sides and into the environment;
   a first array of light receivers, each light receiver configured to receive at least one transmitted light beam that has deflected off an object in the environment before returning to the detection system and deflecting off the active reflective side; and
   an actuator configured to rotate the reflective member around the rotational axis to change the active reflective side to a different one of the plurality of reflective sides;
   a mirror positioned below the reflective member with respect to the rotational axis and offset from the rotational axis, the mirror deflecting light between the reflective member and both the first array of light transmitters and the first array of light receivers; and
   a lens between the first array of light transmitters and the mirror,
   wherein the mirror includes an internal section of a different slope, the lens directing the transmitted light beams towards the internal section.

* * * * *